United States Patent [19]
Hirschler, Jr. et al.

[11] 3,783,841
[45] Jan. 8, 1974

[54] FUEL SYSTEM
[75] Inventors: Daniel A. Hirschler, Jr., Birmingham; Frederick J. Marsee, Clawson, both of Mich.
[73] Assignee: Ethyl Corporation, Richmond, Va.
[22] Filed: Oct. 4, 1971
[21] Appl. No.: 185,940

Related U.S. Application Data

[63] Continuation-in-part of Ser. No. 152,678, June 14, 1971, and a continuation-in-part of Ser. No. 174,015, Aug. 23, 1971.

[52] U.S. Cl............ 123/127, 123/122 E, 123/1 A, 123/2
[51] Int. Cl............................................. F02m 31/16
[58] Field of Search ............... 123/2, 3, 133, 134, 123/127, 179 G; 196/98, 104; 208/356, 359, 381, 366

[56] References Cited
UNITED STATES PATENTS

| | | |
|---|---|---|
| 1,559,214 | 9/1925 | Woolson ............................ 123/127 |
| 1,744,953 | 1/1930 | Dienner ............................. 123/127 |
| 1,576,766 | 3/1926 | Kloepper .......................... 123/127 |
| 2,098,575 | 11/1937 | Flamini .............................. 123/127 |
| 3,021,681 | 2/1962 | Perry ................................. 123/133 |
| 2,126,204 | 8/1938 | Morrell ............................... 196/98 |

Primary Examiner—Laurence M. Goodridge
Attorney—Donald L. Johnson et al.

[57] ABSTRACT

A dual liquid fuel system for an internal combustion engine is disclosed which delivers a liquid volatile hydrocarbon fuel to the engine induction system during start and warm-up and switches to gasoline after the engine attains operating temperature. The volatile hydrocarbon fuel is generated from the normal gasoline used to operate the engine by delivering gasoline to a vaporizing chamber, heating the gasoline in the chamber to vaporize a portion thereof, and condensing the vapors.

4 Claims, 3 Drawing Figures

PATENTED JAN 8 1974 3,783,841

FUEL SYSTEM

This application is a Continuation-in-Part of application Ser. No. 152,678, filed June 14, 1971, and application Ser. No. 174,015, filed Aug. 23, 1971.

BACKGROUND

The exhaust gas of internal combustion engines contains various amounts of unburned hydrocarbons, carbon monoxide and nitrogen oxides ($NO_x$). Emission of these materials to the atmosphere is undesirable. The problem is more acute in urban areas having a high concentration of motor vehicles.

During recent years, researchers have investigated extensively means of reducing exhaust emission. This research has been quite fruitful. As a result, present-day automobiles emit but a fraction of undesirable materials compared to those of less than a decade ago. These improved results have come about through such means as improved carburetion, ignition timing modification, exhaust recycle, exhaust manifold air injection, use of lean air/fuel ratios, positive crankcase ventilation, and the like.

Despite the tremendous advances that have been made, further improvements are desirable. Federal standards by 1975 are expected to require reduction of emissions to only about ten percent of the level of 1970. A major obstacle in achieving further reduction in exhaust emissions is the fact that the engine requires a richer air/fuel mixture during start and warm-up. During this period exhaust emission of even the lowest emitting engine is appreciably increased. In the case of carburetor induction engines the required richer air/fuel mixture is usually attained by placing a choke valve in the air passage above the carburetor venturi, which serves to restrict air flow. In most, but not all, gasoline-powered vehicles the choke is automatically controlled by engine temperature. As soon as the engine reaches an adequate operating temperature (i.e., a temperature at which it can operate smoothly without choking) the choke opens. In normal operation this takes about 2-3 minutes.

In the past, attempts have been made to eliminate the need for this rich operating warm-up period by operating the engine on liquid petroleum gas (LPG) during the warm-up period and switching to gasoline after operating temperature is attained. A drawback of this system is that it requires the vehicle operator to obtain two different kinds of fuel—gasoline and LPG. Of even greater consequence is the fact that the use of a liquid and a gaseous fuel requires a separate metering system for each fuel. For example, the LPG fuel system is separate from the gasoline fuel system and provides LPG vaporization, pressure regulation and, finally, vapor induction into the intake air stream through a separate metering device. Because of this, the system using LPG fuel is considered impractical.

In other systems, cold starting is assisted by directly spraying gasoline into the intake manifold or by passing gasoline through a heated nozzle which gasifies the entire charge before injecting the gaseous fuel into the intake manifold. Neither of these is a dual liquid fuel system in the sense of the present invention because the identical fuel (viz., normal gasoline) is delivered to both induction systems.

An object of the present invention is to provide a fuel induction system that results in lower exhaust emissions. A further object is to provide a fuel induction system that allows an engine to start and warm-up without the necessity of operating the engine at a rich air/fuel ratio. A still further object of the invention is to provide a dual liquid fuel system with self-generation of the more volatile liquid fuel from the normal gasoline fuel, thus eliminating the necessity of the vehicle operator obtaining two separate fuels. Another object is to provide a method of operating a gasoline engine in a manner that will result in reduced exhaust emissions.

SUMMARY

The above and other objects are accomplished by providing a dual liquid fuel system that will operate using a single liquid fuel metering means. The system includes means for delivering both a high volatility fuel and normal gasoline to the engine fuel metering system—either carburetted or fuel injected. Volatile fuel is delivered during start and warm-up and normal gasoline is delivered when the engine attains an operating temperature that allows smooth operation with normal gasoline at the lean air/fuel ratios normally employed for warmed-up operation. Another way of viewing this is that the fuel system allows start and warm-up of the engine without carburetor choking The system includes means for draining residual gasoline from the fuel metering system when the engine is turned off. In addition, the system includes means for generating its own supply of volatile fuel by partially vaporizing with heat normal gasoline and condensing the vapors.

DESCRIPTION OF THE PREFERRED EMBODIMENTS

Figure 1:
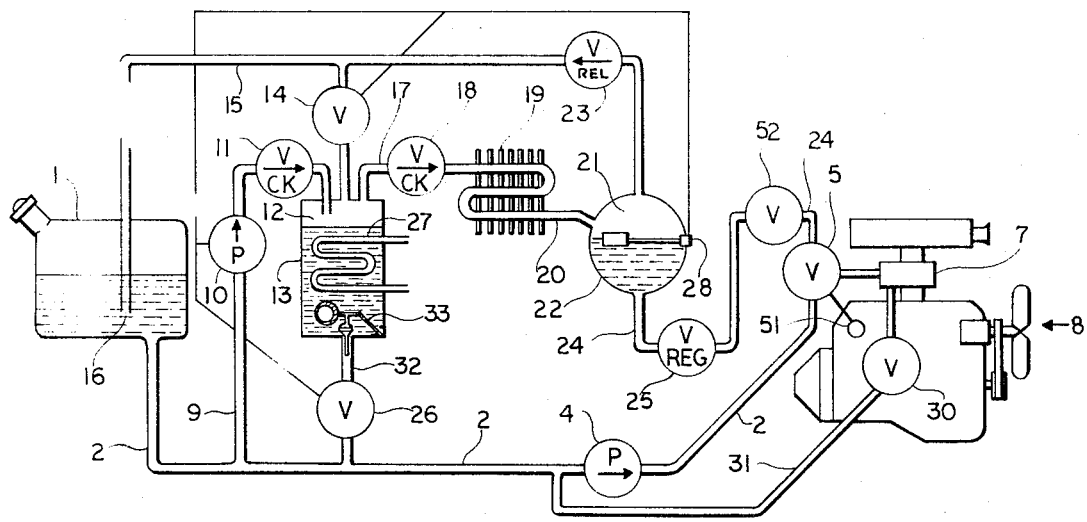
FIG. 1 is a schematic of the dual fuel system showing the fuel flow path and valve arrangement of a preferred embodiment.
Figure 2:
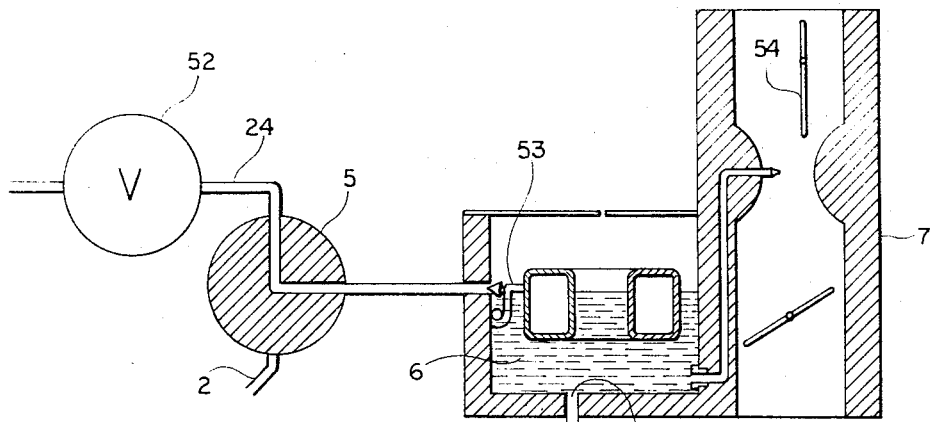
FIG. 2 is a cross-section of a typical carburetor showing the dual fuel delivery conduits and fuel switching valve as well as the fuel bowl drain.

Referring to FIG. 1, a gasoline tank 1 is connected through conduit 2, fuel pump 4 and fuel switching valve 5 to the fuel bowl 6 (FIG. 2) of carburetor 7 mounted on the intake manifold of spark ignited internal combustion engine 8. Fuel tank 1 serves as a source of normal gasoline.

Gasoline is a liquid mixture of hydrocarbons having a boiling range of from about 80°F. to about 430°F. as measured by ASTM method D-86. Of course, these mixtures can contain individual constituents boiling above or below these figures. These hydrocarbon mixtures contain aromatic hydrocarbons, saturated hydrocarbons and olefinic hydrocarbons. The bulk of the hydrocarbon mixture is obtained by refining crude petroleum by either straight distillation or through the use of one of the many known refining processes, such as thermal cracking, catalytic cracking, catalytic hydroforming, catalytic reforming, and the like. Generally, the final gasoline is a blend of stocks obtained from several refinery processes. The final blend may also contain hydrocarbons made by other procedures such as alkylate made by the reaction of $C_4$ olefins and butanes using an acid catalyst, such as sulfuric acid or hydrofluoric acid.

Preferred gasolines are those having a Research Octane Number of at least 85. A more preferred Research Octane Number is 90 or greater. It is also preferred to blend the gasoline such that it has a content of aromatic hydrocarbons ranging from 10 to about 60 volume percent, an olefinic hydrocarbon content ranging from 0 to about 30 volume percent, and a saturate hydrocarbon content ranging from about 40 to 80 volume percent, based on the whole gasoline.

In order to obtain fuels having properties required by modern automotive engines, a blending procedure is generally followed by selecting appropriate blending stocks and blending them in suitable proportions. The required octane level is most readily accomplished by employing aromatics (e.g., BTX, catalytic reformate, or the like), alkylate (e.g., $C_{6-9}$ saturates made by reacting $C_4$ olefins with isobutane using a HF or $H_2SO_4$ catalyst), or blends of different types.

The balance of the whole fuel may be made up of other components such as other saturates, olefins, or the like. The olefins are generally formed by using such procedures as thermal cracking, catalytic cracking and polymerization. Dehydrogenation of paraffins to olefins can supplement the gaseous olefins occurring in the refinery to produce feed material for either polymerization or alkylation processes. The saturated gasoline components comprise paraffins and naphthenes. These saturates are obtained from (1) virgin gasoline by distillation (straight run gasoline), (2) alkylation processes (alkylates), and (3) isomerization procedures (conversion of normal paraffins to branched-chain paraffins of greater octane quality). Saturated gasoline components also occur in so-called natural gasoline. In addition to the foregoing, thermally cracked stocks, catalytically cracked stocks and catalytic reformates contain saturated components.

Utilization of non-hydrocarbon blending stocks or components in formulating the fuels used in this invention is feasible and, in some instances, may actually be desirable. Thus, use may be made of methanol, tertiary butanol and other inexpensive, abundant and non-deleterious oxygen-containing fuel components.

The gasoline may contain any of the other additives normally employed to give fuels of improved quality, such as tetraalkyllead antiknocks including tetramethyllead, tetraethyllead, mixed tetraethyltetramethyl lead, and the like. They may also contain antiknock quantities of other agents, such as cyclopentadienyl nickel nitrosyl, methylcyclopentadientyl manganese tricarbonyl, ferrocene, methylferrocene, N-methyl aniline, and the like. Antiknock promoters such as tert-butyl acetate may be included. Halohydrocarbon scavengers such as ethylene dichloride, ethylene dibromide and dibromo butane may be added. Phosphorus-containing additives such as tricresyl phosphate, methyl diphenyl phosphate, diphenyl methyl phosphate, trimethyl phosphate, and tris($\beta$-chloropropyl)phosphate may be present. Antioxidants such as 2,6-di-tert-butylphenol, 2,6-di-tert-butyl-p-cresol, phenylenediamines such as N-isopropylphenylenediamine, and the like, may be present. Likewise, the gasoline can contain dyes, metal deactivators, or any of the additives recognized to serve some useful purpose in improving the gasoline quality.

The liquid hydrocarbon fuel of the lower gasoline boiling range, referred to hereafter as volatile fuel or condensate, are hydrocarbons having a final boiling point below that of normal gasoline. In the present invention it is not necessary to place an exact value on this final boiling point and, in fact, it can vary when the dual fuel system is used with different engines. The requirement is that the volatile fuel have a final boiling point low enough such that the particular engine to which the dual fuel system is connected will start and operate smoothly during warm-up without resorting to a richer air/fuel ratio than is required for operation at normal operating temperature. This is not to say that the use of a richer air/fuel ratio is excluded because under very cold conditions a slightly richer mixture may be required, especially to start the engine. This richer mixture is readily furnished by such means as choking the engine. However, the amount of time that the enriched air/fuel ratio is used will be substantially less than required without the dual fuel system of this invention and, accordingly, even when some choking is required, the overall exhaust emissions will be still greatly reduced by the use of the dual fuel system of this invention.

The optimum final boiling point for the volatile fuel to be used in the dual fuel system on a particular engine is best determined experimentally taking into account the conditions such as temperature and humidity, etc., under which the engine will be operated. A useful boiling range for the volatile fuel is from about 50°–300°F. Especially good results are obtained in most applications using a volatile fuel having a normal boiling range up to about 150°F. (ASTM D-86). The most preferred volatile fuel is made up of the light ends (low boilers) obtained from normal gasoline. This fraction can be obtained by vaporizing or distilling the front 5–25 per cent of gasoline and condensing the vapors. In fact, further embodiments of this invention, to be described in detail hereafter, include in the dual liquid fuel system means for removing the light ends from normal gasoline and using these as the volatile fuel during start and warm-up.

Referring again to FIG. 1, tank 1 is connected through conduit 2, second conduit 9, pump 10, and one-way check valve 11 to vaporizing chamber 12 formed by cylindrical housing 13. The top of chamber 12 connects through valve 14 and conduit 15 to the lower liquid area 16 in tank 1.

The top of chamber 12 also connects through vapor conduit 17 and one-way check valve 18 to air-cooled finned condenser 19 which in turn connects through condensate conduit 20 to storage container 21 formed by spherical housing 22.

The bottom of vaporizing chamber 12 connects by drain conduit 32 through valve 26 to conduit 2. Float actuated drain valve 33 is located within chamber 12 and mounted on the bottom of housing 13. This is more clearly shown in FIG. 3. Float 40 is pivotably connected by arm 41 to hinge 42. Restraint 43 serves to restrict the rotation of arm 41 such that guide 44 always remains in passage 45. Valve member 46, having a lower inverted conical surface with guide 44 attached to its apex, is pivotably connected by rod 47 to arm 41 at hinge 48. Valve seat 49 forms circular orifice 50 into which guide 44 extends and on which the lower inverted conical surface of valve member 46 seats. Float 40 is of such size and density that it provides just enough upward buoyancy when immersed in gasoline to lift valve member 46 from orifice 50 but not enough buoyancy to lift valve member 46 when pressure substantially above atmospheric exists in chamber 12. This is because such pressure imparts additional downward force on valve member 46 proportional to the area of orifice 50 and the pressure in chamber 12.

Heat exchange conduit 27 is coiled within chamber 12 and connects through housing 13 to the liquid cooling system of the engine. This connection is not shown but is well known since it is the same manner in which standard automobile interior heaters are connected.

The top of chamber 21 connects through pressure relief valve 23 and conduit 15 to tank 1. The bottom of chamber 21 connects by conduit 24 through pressure regulating valve 25, valve 52, and fuel switching valve 5 to the fuel bowl 6 of carburetor 7.

Inside chamber 21 and mounted on the inner surface of housing 22 is liquid level actuating switch 28 which is connected by signal means to pump 10 and valve 26.

The bottom of fuel bowl 6 connects through drain 29 by drain conduit 31 through drain valve 30 to conduit 2 as shown.

Temperature sensor 51 is mounted on engine 8 in a known manner and is provided with means to signal fuel switching valve 5.

In operation starting with a cold engine, turning on the ignition system closes carburetor drain valve 30 and opens valve 52. Temperature sensor 51 detects engine temperature below normal and signals fuel switching valve 5 to open the flow path through conduit 24 to container 21 which contains previously generated condensate. This is shown schematically in FIG. 2. Condensate from container 21 flows through conduit 24 and passes through pressure regulating valve 25 which reduces its pressure to about 3–10 psig, so that it can be controlled by float actuated valve 53 in fuel bowl 6. Condensate fills fuel bowl 6. The starter is actuated and the engine starts with little or no choking by choke valve 54. As the engine operates, the engine temperature rises until sensor 51 detects a temperature at which experience has shown the engine will operate satisfactorily without choking. This is called "operating temperature" and is not necessarily the maximum temperature which the engine will attain but, rather, some intermediate temperature. The operating temperature will vary with the particular engine, but is easily determined experimentally.

After the engine operates on condensate for some time, switch 28 detects a drop in condensate level in container 21 below a predetermined level and signals pump 10 to operate and valves 14 and 26 to close. In a preferred arrangement, pump 10 will not operate until heat is available to vaporize gasoline in chamber 12. This is readily provided by a temperature sensor responsive to engine coolant temperature which cuts out pump 10 until the coolant is hot. Gasoline is then pumped through one-way check valve 11 to chamber 12. The pump rate is adjusted such that gasoline is delivered to chamber 12 at a rate which allows sufficient time for the volatiles to be distilled out without overfilling chamber 12.

Figure 3:
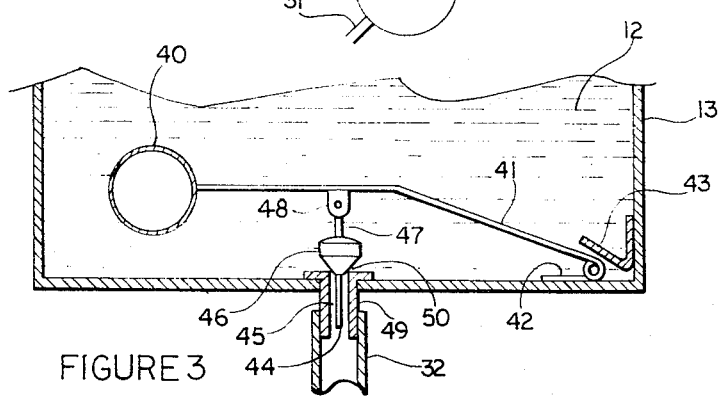
FIG. 3 is a cross-sectional view showing in detail the drain valve arrangement of the vaporizing chamber.

Hot engine coolant circulating in heat exchange conduit 27 causes the volatile portion of the gasoline to vaporize, thus increasing the pressure in chamber 12. Optionally, hot exhaust gas can be circulated through conduit 27 to supply the heat required to vaporize a portion of the gasoline. For example, gasoline has a vapor pressure of around 65 psig at 200°F., although this varies from fuel to fuel and varies considerably from summer to winter. Fortunately, in winter there are more volatile components (e.g., butanes, pentanes, etc.) in gasoline which is when the need for them as a source of condensate will be greatest. When the pressure in chamber 12 exceeds the pressure in container 21, vapors pass through conduit 17 and one-way check valve 18 into condenser 19, which cools the vapor causing it to condense to form a condensate of the volatile gasoline fraction. The condensate flows into container 21 replenishing the supply that has been used to start and warm-up the engine. Condensate is stored in container 21 under moderate pressure (e.g., from about 5–75 psig). Any excess pressure above that required to store the condensate under ambient conditions which might be caused by the entry of non-condensables such as air into container 21 is vented through pressure relief valve 23 and conduit 15 back to tank 1. When the supply of condensate in container 21 is adequate for the next start and warm-up operation, switch 28 signals pump 10 to stop and valves 14 and 26 to open. Chamber 12 is slowly vented to gasoline tank 1 into the liquid gasoline wherein the residual gasoline vapor from chamber 12 redissolves. Residual pressure in chamber 12 holds valve member 46 seated in orifice 50 and the venting is substantially complete. Float 40 is sized such that it provides only enough buoyancy to lift arm 41 and valve member 46 when the pressure in chamber 12 is vented, but enough buoyancy to do so when chamber 12 is pressurized. In FIG. 3, valve member 46 is shown seated despite the presence of liquid in chamber 12. This is due to the system being under pressure from the heated gasoline which causes valve member 46 to remain seated. Float 40 lifts arm 41 against restraint 43 raising valve member 46 and allowing the volatile-depleted gasoline in chamber 12 to pass through passage 45 and conduit 32 and into conduit 2. It is then delivered to the engine induction system through fuel pump 4 and fuel switching valve 5. If the engine does not operate for a time sufficient to consume the volatile-depleted fuel in chamber 12 the remainder will drain back through conduit 2 to gasoline tank 1. When the liquid level in chamber 12 drops to a predetermined level, float 40 lowers arm 41 and seats valve member 46 in orifice 50. This prevents air from entering conduit 2.

The volumetric capacity of chamber 12 is preferably adequate to hold all of the volatile-depleted fuel resulting from the generation of sufficient condensate to fill container 21 and still provide adequate free space above the volatile-depleted fuel level in chamber 12 to permit vaporization without causing liquid to enter conduit 17.

When the engine is turned off, valve 30 opens and valve 52 closes. This allows fuel bowl 6 to drain and prevents the condensate in container 21 from entering fuel bowl 6 in the event that fuel switching valve 5 is still selecting condensate.

If the engine is again started before cooling down, fuel pump 4 will rapidly fill bowl 6 with gasoline as the engine cranks and the engine will start and operate on gasoline. However, if the engine cools down below operating temperature fuel switching valve 5 will switch to condensate and the above described cycle will be repeated.

It is desirable to include in the system an override mechanism which cuts out the automatic fuel switching by valve 5 in response to sensor 51. This is to handle the situation when sensor 51 signals a temperature below operating temperature and sets valve 5 to deliver condensate but container 21 is empty. In this event, the automatic system is cut out and valve 5 is set manually to deliver normal gasoline to the fuel bowl and the engine is started with normal gasoline utilizing choke 53 as required.

The present dual fuel system has the advantage that it permits operation of the engine using only liquid fuel induction rather than a combination of liquid and gaseous fuel induction. The induction means used may be any standard induction means such as fuel injection or carburetor induction. Likewise, the condensate may be injected directly into the air stream in the carburetor either above or below the venturi or into the intake manifold. When the system is employed in this manner the injection should be at a metered rate proportional to the engine demand.

The preferred system is one employing standard carburetor induction. Such systems are well known and highly developed. The present system permits continued use of such highly developed carburetors but still allows the low emission benefits attributable to a dual fuel system. The present system when used with a standard carburetor does not require a separate fuel bowl nor does it require a separate fuel jet and nozzle, although these may be used if desired. The carburetor may have a single fuel nozzle per venturi, or may have a plurality of fuel nozzles. Likewise, the carburetor may be single venturi or may be multiple venturi such as two venturi, three venturi or four venturi carburetors. Also, more than one carburetor may be used on a single engine to gain volumetric efficiency.

We claim:

1. A fuel system for a gasoline fueled spark ignited internal combustion engine comprising a gasoline source, a conduit connecting said gasoline source through fuel switching means to the fuel inlet of a carburetor mounted on the engine intake manifold, a vaporizing chamber, a second conduit connecting said gasoline source to said vaporizing chamber, pump means in said second conduit adapted to pump gasoline into said vaporizing chamber, a one-way check valve in said second conduit between said pump means and said vaporizing chamber adapted to allow flow towards said chamber but stop reverse flow, heating means in said vaporizing chamber adapted to vaporize a volatile portion of said gasoline pumped into said chamber thereby increasing the pressure in said chamber, a vapor conduit connecting said chamber with condensing means, a one-way check valve in said vapor conduit adapted to allow flow towards said condensing means in response to said increased pressure in said chamber and to stop reverse flow whereby said volatile portion is condensed forming condensate, a container for said condensate connected to said condensing means, and a condensate conduit connecting said container through said valve switching means to said fuel inlet of said carburetor, said fuel switching means functioning to deliver said condensate to said fuel inlet when said engine is below operating temperature and to deliver said gasoline to said fuel inlet when said engine is at or above operating temperature.

2. A dual fuel system of claim 1, wherein said engine is liquid cooled and said heating means are provided by a heat exchange conduit adapted to be in heat exchange contact with said gasoline in said vaporizing chamber, said heat exchange conduit being connected to the engine liquid coolant system and adapted to circulate heated engine liquid coolant through said heat exchange conduit.

3. A fuel system for a gasoline fueled spark ignited internal combustion engine comprising a gasoline source, a conduit connecting said gasoline source through fuel switching means to the fuel inlet of a carburetor mounted on the engine intake manifold, a vaporizing chamber, a second conduit connecting said gasoline source to said vaporizing chamber, pump means in said second conduit adapted to pump gasoline into said vaporizing chamber, a one-way check valve in said second conduit between said pump means and said vaporizing chamber adapted to allow flow towards said chamber but stop reverse flow, heating means in said vaporizing chamber adapted to vaporize a volatile portion of said gasoline pumped into said chamber thereby increasing the pressure in said chamber, a vapor conduit connecting said chamber with condensing means, a one-way check valve in said vapor conduit adapted to allow flow towards said condensing means in response to said increased pressure in said chamber and to stop reverse flow whereby said volatile portion is condensed forming condensate, a container for said condensate connected to said condensing means, a condensate conduit connecting said container through said valve switching means to said fuel inlet of said carburetor, said fuel switching means functioning to deliver said condensate to said fuel inlet when said engine is below operating temperature and to deliver said gasoline to said fuel inlet when said engine is at or above operating temperature, a drain conduit connecting the bottom of said vaporizing chamber to said gasoline source, a drain valve in said drain conduit adapted to remain closed when the pressure in said vaporizing chamber is above atmospheric and to open when said pressure drops to substantially atmospheric, a vent conduit connecting the top of said vaporizing chamber to said gasoline source, a vent valve in said vent conduit, and a liquid level sensor in said condensate container adapted to (1) close said vent valve, and (2) start said pump means when the liquid condensate level drops below a predetermined level.

4. A fuel system of claim 3 wherein said drain valve is a float-actuated valve adapted to (1) remain closed when said vaporizing chamber is under pressure or is substantially empty, and (2) open when said vaporizing chamber contains a substantial amount of liquid and is at substantially atmospheric pressure.

* * * * *

PO-1050
(5/69)

UNITED STATES PATENT OFFICE
CERTIFICATE OF CORRECTION

Patent No. 3,783,841      Dated January 8, 1974

Inventor(s) Daniel A. Hirschler, Jr., and Frederick J. Marsee

It is certified that error appears in the above-identified patent and that said Letters Patent are hereby corrected as shown below:

Column 7, line 57, delete "valve" and replace with -- fuel --.
Column 8, line 35, delete "valve" and replace with -- fuel --.

Signed and sealed this 23rd day of April 1974.

(SEAL)
Attest:

EDWARD M. FLETCHER, JR.
Attesting Officer

C. MARSHALL DANN
Commissioner of Patents